UNITED STATES PATENT OFFICE.

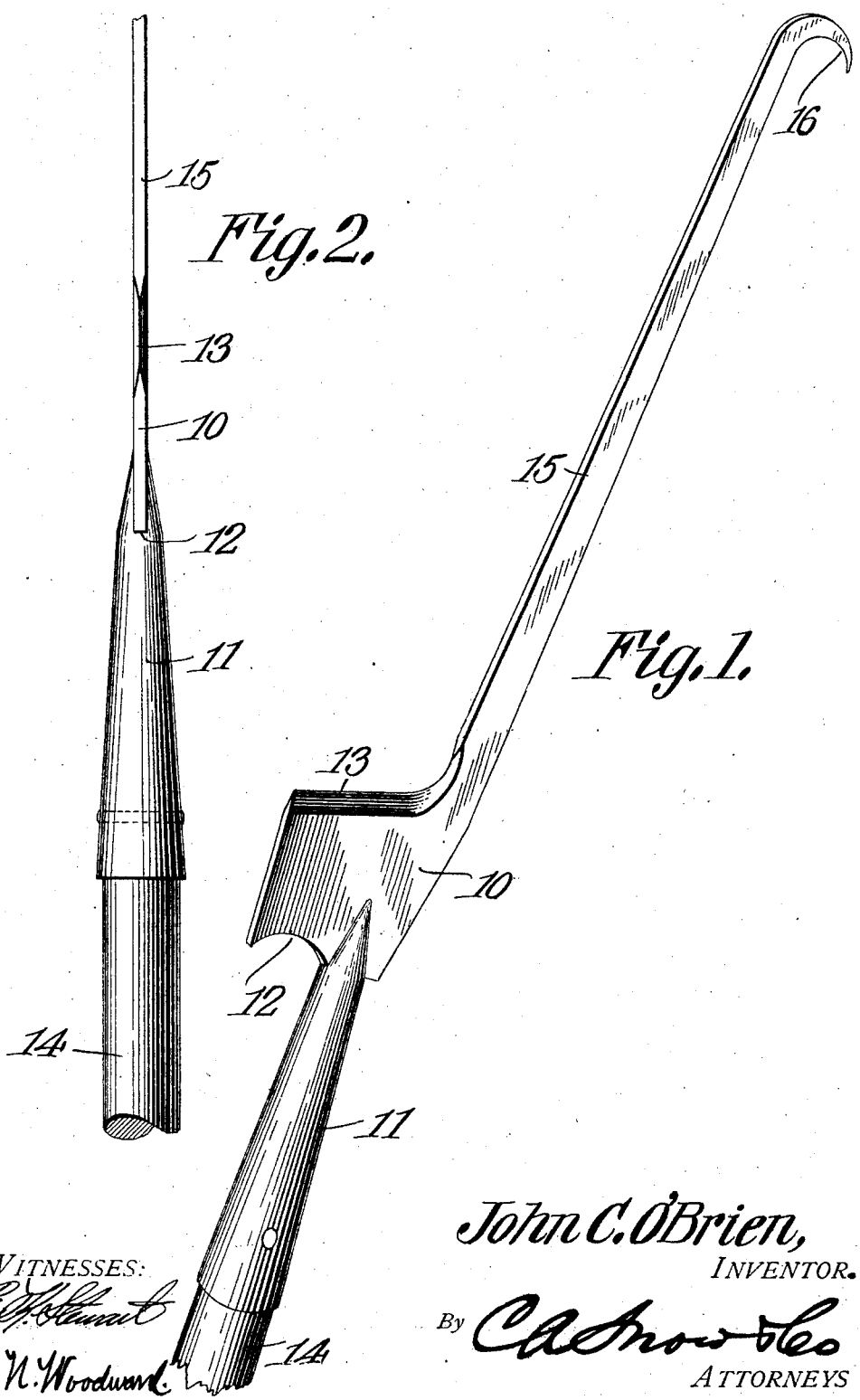

JOHN CORNELIOUS O'BRIEN, OF MURPHYTOWN, WEST VIRGINIA.

PRUNING IMPLEMENT.

No. 846,135.  Specification of Letters Patent.  Patented March 5, 1907.

Application filed July 16, 1906. Serial No. 326,461.

*To all whom it may concern:*

Be it known that I, JOHN CORNELIOUS O'BRIEN, a citizen of the United States, residing at Murphytown, in the county of Wood and State of West Virginia, have invented a new and useful Pruning Implement, of which the following is a specification.

This invention relates to pruning implements, and has for its object to simplify and improve the construction and increase the efficiency and utility of implements of this character.

With these and other objects in view, which will appear as the nature of the invention is better understood, the invention consists in certain novel features of construction, as will be hereinafter fully described.

In the drawings forming a part of this specification, and in which corresponding parts are denoted by like designating characters, is illustrated a preferred embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawing, Figure 1 is a perspective view of the improved implement. Fig. 2 is an edge view of a portion of the same.

The improved implement comprises a stock 10, preferably of plate-steel and with a handle-socket 11 depending from one edge and a hook 12 adjacent to the socket. The stock is also provided with a cutting edge 13 and a guide-arm 15, extending from the socket adjacent to the knife-edge and with one face merging into the knife-edge. The guide-arm terminates in a hook 16, and the socket 11 is provided with a handle 14, of any required length.

In using the implement the guide-arm 15 is placed against the limb to be severed and the implement thrust upward, the arm effectually guiding the cutting edge 13 of the stock against the limb, severing it with certainty and without injuring the limb. The thrust being upward, the bark at the lower side of the limb is first severed. Consequently there is no danger of "stripping" the stump of the limb, as so frequently occurs when the construction of the implement requires a downward cutting.

The knife-edge 13 merges gradually into the adjacent face of the guide-arm, so that a "shearing" action is produced, and the power required to operate the implement thereby materially reduced.

The parts are preferably forged or otherwise constructed in one piece.

Having thus described the invention, what is claimed as new is—

1. As a new article of manufacture, a pruning implement comprising a socket, a stock having a cutting edge extending at right angles to the socket, and a guide-arm extending from one edge toward one side of the cutter from one side of the stock and terminating in a hook projection in a direction opposite to that of the cutting edge of the stock.

2. As a new article of manufacture, a pruning implement comprising a socket, a flattened stock combined therewith and having its under edge provided with a hook disposed to one side of the socket, and its upper edge, that constitutes the knife, disposed at approximate right angles to the socket, and a guide-arm extending from one side of the stock and terminating in a hook projection in a direction opposite to that of the cutting edge of the stock.

In testimony that I claim the foregoing as my own I have hereto affixed my signature in the presence of two witnesses.

JOHN CORNELIOUS O'BRIEN.

Witnesses:
DAVID H. LEONARD,
BERNICE C. McNULTY.